United States Patent Office 3,030,236

Patented Apr. 17, 1962

3,030,236

METHOD OF FORMING A PHOTOSENSITIVE LAYER OF LEAD SULFIDE CRYSTALS ON A GLASS PLATE

Raymond Cooperstein, Rochester, N.Y., assignor to Eastman Kodak Company, Rochester, N.Y., a corporation of New Jersey No Drawing. Filed Dec. 21, 1956, Ser. No. 630,006
6 Claims. (Cl. 117—213)

This invention relates to photoconductive cells. In one of its aspects this invention relates to the manufacture of infra-red sensitive lead sulfide photoconductive cells.

Photoconductive cells are electrical devices whose conductivities change when exposed to light radiation with the degree of change being dependent upon the intensity and the characteristics of the incident light. It has been known for some years that lead sulfide can be used to form photosensitive layers particularly sensitive to infra-red radiation.

Lead sulfide cells have been prepared by two methods generally referred to as chemical deposition and vacuum evaporation. In the chemical deposition procedure, one of the methods employed for producing lead sulfide cells involves the use of a solution of a lead salt such as lead nitrate. The lead salt solution is mixed with a thiourea solution and after a suitable period of time a glass plate which preferably has been subjected to a seeding operation is immersed in the resulting mixture. Subsequently, the glass plate is removed from the bath containing the coating mixture and washed and dried to form the desired photoconductive cell.

Lead sulfide cells, when prepared according to such a procedure, exhibit the general characteristics shown below when exposed to a 500 Kelvin radiation from a black body, having a ½ inch diameter, held at 5 feet from the photoconductive film and applying a polarizing potential of 22.5 volts across the cell plus a matching ballast resistance; the amplifier gain is 20,000 times; and the amplifier bandpass is 20 to 700 cycles per second.

| | |
|---|---|
| Resistance of film | 1.0 megohm. |
| Electrical noise of film | 0.06 volt, R.M.S. |
| Responsivity of film | 2.5 volts, R.M.S. |

In accordance with this invention, it has been found that the properties of lead sulfide photoconductive cells can be substantially improved by employing in the lead sulfide precipitating mixture a lower aliphatic alcohol such as ethanol, n-propanol, and the like, and nickel ions preferably obtained from a nickel salt of an inorganic acid such as nickel nitrate. Lead sulfide photoconductive cells prepared in accordance with this invention exhibit the following general characteristics when tested under the conditions set forth above:

| | |
|---|---|
| Resistance of film | 0.3 to 1.0 megohm. |
| Electrical noise of film | 0.0 volt, R.M.S. |
| Responsivity of film | 4.0 to 7.0 volts, R.M.S. |

A layer of lead sulfide can be deposited on a substrate such as glass, quartz and the like, by precipitation from a lead salt solution. The precipitation can be caused by the decomposition of a lead salt such as lead nitrate, lead acetate, lead chlorate, lead perchlorate, and the like and thiourea through the action of an alkali metal hydroxide, such as sodium hydroxide. Preferably the glass plate or similar surface on which the layer of lead sulfide is to be formed is treated prior to precipitation of the lead sulfide with a seeding solution such as a colloidal solution of lead sulfide stabilized with polyvinyl alcohol. The glass plate in the pretreated, seeded condition is more attractive to and a better adsorber of the lead sulfide nuclei formed during the hydrolysis of the lead-thiourea compound on which the lead sulfide crystals grow. After the photosensitive film has been deposited on the glass plate, the excess scum is carefully removed with a wet camel's hair brush. Temporary electrodes are painted along two opposite edges of the coated plate for test purposes and all the edges are ground on an emery wheel. The lead sulfite cell is then stored overnight open to the atmosphere before being tested. After being tested, the cell is stored in an oven at 40° C. for a period of 2 weeks and then removed from the oven and allowed to cool to room temperature and finally retested.

To prepare the glass blanks for deposition of lead sulfide, the blanks are immersed in a seed base solution prior to the initiation of the deposition reaction. By way of example, the seed solution can contain the following constituents:

15 ccs. of 0.5% polyvinyl alcohol
235 ccs. of distilled water
0.35 cc. of lead nitrate solution containing 100 grams of lead nitrate in 1 liter of distilled water
Hydrogen sulfide sufficient to produce a final sulfide ion concentration of 0.002 N The seed base solution is allowed to stand for ½ to 1 hour before the glass blanks are immersed in it. The immersion period of the glass blanks in the seed solution is 0.75 to 1.5 hours.

In order to prepare the solution for precipitating lead sulfide on the seeded glass plate, two solutions are ordinarily formed, viz., a plumbite solution and a thiourea solution. The plumbite solution can contain by way of example, 134 ccs. of distilled water, 90 ccs. of sodium hydroxide solution containing 140 grams of sodium hydroxide in 1 liter of distilled water, 100 ccs. of lead nitrate solution containing 100 grams of lead nitrate in one liter of distilled water and 106 ccs. of denatured ethanol. The ethanol is preferably added to the plumbite solution just prior to the initiation of the reaction.

The thiourea solution can contain by way of example 100 ccs. of distilled water, 0.1 cc. of 0.1 M nickel nitrate solution, 10 grams of thiourea and 2 grams of sodium sulfite. The nickel nitrate and sodium sulfite are preferably added to the dissolved thiourea solution in the order listed.

The plumbite and thiourea solutions are mixed with stirring to initiate the deposition. This mixture is then poured into containers and permitted to stand at a constant temperature of 5 to 40° C., preferably 18 to 30° C. and more preferably 23° C. When the reaction mixtures in the containers have turned black, the seeded glass blanks or plates are inserted, preferably at an angle, in the precipitating solution. The deposition reaction is allowed to continue for a period of 10 to 60 minutes, preferably 25 to 30 minutes, and the reaction can then be stopped by flushing the containers with wash water. Both sides of the glass blanks are usually coated with lead sulfide. The underside of the inclined blank is the sensitive surface and can be differentiated from the insensitive side by its relative lack of sooty lead sulfide deposit. The sooty lead sulfide deposit is removed from both sides of the coated cell blanks with a wetted camel's hair brush and the coated blanks are then dried.

The following examples are illustrative of precipitating solutions that can be prepared in the manner described above and used in the preparation of photoconductive cells within the scope of this invention. In these examples the sodium hydroxide solution contains 140 grams of sodium hydroxide per liter of water and the lead nitrate solution contains 100 grams of lead nitrate per liter of water.

*Example 1*

(*a*) 234 ccs. of distilled water
(*b*) 90 ccs. of sodium hydroxide solution
(*c*) 100 ccs. of lead nitrate solution
(*d*) 106 ccs. of 3–A denatured ethanol
(*e*) 0.1 cc. of 0.1 M nickel nitrate solution
(*f*) 10 grams of thiourea
(*g*) 2 grams of sodium sulfite

*Example 2*

(*a*) 234 ccs. of distilled water
(*b*) 90 ccs. of sodium hydroxide solution
(*c*) 100 ccs. of lead nitrate solution
(*d*) 106 ccs. of 3–A denatured ethanol
(*e*) 0.1 cc. of 0.1 M nickel nitrate solution (acidified)
(*f*) 12 grams of thiourea
(*g*) 2 grams of sodium sulfite

*Example 3*

(*a*) 234 ccs. of distilled water
(*b*) 90 ccs. of sodium hydroxide solution
(*c*) 100 ccs. of lead nitrate solution
(*d*) 106 ccs. of 3–A denatured ethanol
(*e*) 0.4 cc. of 0.025 M nickel nitrate solution
(*f*) 10 grams of thiourea
(*g*) 1.7 grams of sodium bisulfide

*Example 4*

(*a*) 234 ccs. of distilled water
(*b*) 90 ccs. of sodium hydroxide solution
(*c*) 100 ccs. of lead nitrate solution
(*d*) 106 ccs. of 3–A denatured ethanol
(*e*) 0.1 cc. of 0.1 M nickel nitrate solution
(*f*) 10 grams of thiourea
(*g*) 1.7 grams of sodium bisulfite

*Example 5*

(*a*) 234 ccs. of distilled water
(*b*) 90 ccs. of sodium hydroxide solution
(*c*) 100 ccs. of lead nitrate solution
(*d*) 106 ccs. of 3–A denatured ethanol
(*e*) 0.1 cc. of 0.1 M nickel nitrate solution
(*f*) 12 grams of thiourea
(*g*) 1.7 grams of sodium bisulfite

*Example 6*

(*a*) 234 ccs. of distilled water
(*b*) 90 ccs. of sodium hydroxide solution
(*c*) 100 ccs. of lead nitrate solution
(*d*) 106 ccs. of 3–A denatured ethanol
(*e*) 0.1 cc. of 0.1 M nickel nitrate solution
(*f*) 12 grams of thiourea
(*g*) 1.5 grams of sodium metabisulfite

*Example 7*

(*a*) 234 ccs. of distilled water
(*b*) 90 ccs. of sodium hydroxide solution
(*c*) 100 ccs. of lead nitrate solution
(*d*) 106 ccs. of 3–A denatured ethanol
(*e*) 0.1 cc. of 0.1 M nickel nitrate solution
(*f*) 10 grams of thiourea
(*g*) 1.5 grams of sodium metabisulfite

*Example 8*

(*a*) 234 ccs. of distilled water
(*b*) 90 ccs. of sodium hydroxide solution
(*c*) 100 ccs. of lead nitrate solution
(*d*) 106 ccs. of 3–A denatured ethanol (*e*) 0.4 cc. of 0.025 M nickel nitrate solution
(*f*) 10 grams of thiourea
(*g*) 1.5 grams of sodium metabisulfite

*Example 9*

(*a*) 234 ccs. of distilled water
(*b*) 90 ccs. of sodium hydroxide solution
(*c*) 100 ccs. of lead nitrate solution
(*d*) 106 ccs. of 3–A denatured ethanol
(*e*) 0.1 cc. of 0.1 M nickel nitrate solution
(*f*) 12 grams of thiourea
(*g*) 0.85 gram of sodium bisulfite
(*h*) 0.75 gram of sodium metabisulfite For the most desirable results, the ratio of lead salt to sodium hydroxide and the concentration of thiourea in the lead sulfide solution should be maintained within certain limits. For example, the solution can contain a concentration of lead between 0.05 and 0.06 molar. The alkali metal hydroxide concentration can be between 0.55 and 0.75 molar and the thiourea concentration can be between 0.15 and 0.3. In all of the above examples, the volume of alcohol employed was 106 ccs. Desirable results can be obtained by varying the volume of alcohol from 50 to 150 ccs. Similarly the volume of 0.1 M nickel nitrate solution can be varied from 0.1 to 1 cc., and, if the nickel nitrate solution is other than 0.1 M, the volume of solution used is varied accordingly. Consequently the precipitating solution can contain from 95–285 parts by volume of alcohol per 1,000 parts of solution and a nickel salt concentration within the range of $3.5\times10^{-6}$ to $3.5\times10^{-5}$ grams per cubic centimeter.

I claim:

1. The method of forming a photosensitive layer of lead sulfide crystals which comprises precipitating lead sulfide crystals onto a prepared glass plate by adding a solution of thiourea containing nickel nitrate to a sodium hydroxide solution of lead nitrate containing ethanol, the concentrations in the solutions when first combined being as follows: lead between 0.05 and 0.06 molar, sodium hydroxide between 0.55 and 0.75 molar, thiourea between 0.15 and 0.3 molar, ethanol between 95 and 285 parts by volume per 1,000 parts of solution and nickel nitrate between $3.5\times10^{-6}$ and $3.5\times10^{-5}$ grams per cubic centimeter of solution, by immersing the glass plate in the combined solutions to receive precipitated crystals of lead sulfide and then drying the glass plate containing lead sulfide.

2. The process according to claim 1 wherein the ethanol is added to the sodium hydroxide solution immediately prior to addition of the thiourea solution.

3. The method according to claim 1 wherein the thiourea solution and sodium hydroxide are reacted at a temperature of 5 to 40° C.

4. The method according to claim 1 wherein the thiourea solution and sodium hydroxide are reacted at a temperature of 18 to 30° C.

5. The method according to claim 1 wherein the glass plate is prepared for coating with lead sulfide by immersion in a seeding solution containing lead nitrate, hydrogen sulfide and polyvinyl alcohol.

6. The method according to claim 1 wherein the prepared glass plate is immersed in the combined solutions for a period of 10 to 60 minutes.

References Cited in the file of this patent

UNITED STATES PATENTS 2,659,682 Anderson ------------- Nov. 17, 1953